(12) United States Patent
Vaughn et al.

(10) Patent No.: US 9,220,203 B2
(45) Date of Patent: Dec. 29, 2015

(54) RAISED GARDEN BED WITH LOUVER-SECURED CORNER BRACKETS

(71) Applicant: Woodstream Corporation, Lititz, PA (US)

(72) Inventors: William Vaughn, Lititz, PA (US); David W. Swift, Lititz, PA (US)

(73) Assignee: WOODSTREAM CORPORATION, Lititz, PA (US)

( * ) Notice: Subject to any disclaimer, the term of this patent is extended or adjusted under 35 U.S.C. 154(b) by 217 days.

(21) Appl. No.: 13/852,229

(22) Filed: Mar. 28, 2013

(65) Prior Publication Data

US 2014/0290136 A1 Oct. 2, 2014

(51) Int. Cl.
*A01G 9/02* (2006.01)
*A01G 1/08* (2006.01)
*F16B 7/04* (2006.01)

(52) U.S. Cl.
CPC .. *A01G 9/02* (2013.01); *A01G 1/08* (2013.01); *F16B 7/048* (2013.01); *Y10T 29/49959* (2015.01); *Y10T 403/42* (2015.01)

(58) Field of Classification Search
CPC ..................................................... A01G 9/104

USPC ...................... 47/66.1, 86; 229/198.1; 217/69
See application file for complete search history.

(56) References Cited

U.S. PATENT DOCUMENTS

| 406,156 | A | * | 7/1889 | Weir | 217/65 |
|---|---|---|---|---|---|
| 1,031,691 | A | * | 7/1912 | Courville | 217/69 |
| 1,397,623 | A | * | 11/1921 | Dorn et al. | 217/69 |
| 1,441,393 | A | * | 1/1923 | Benish | 217/69 |
| 1,691,158 | A | * | 11/1928 | Lion | 217/69 |
| 2,168,911 | A | * | 8/1939 | Meyer | 403/205 |
| 3,760,465 | A | * | 9/1973 | Brennan | 229/198.1 |
| 4,201,307 | A | * | 5/1980 | Malloy | 220/62 |
| D312,783 | S | * | 12/1990 | Sharp | D9/434 |
| 7,424,787 | B2 | * | 9/2008 | Singer | 47/19.1 |
| 8,251,222 | B2 | * | 8/2012 | Rego Garcia De Alba | 206/600 |
| D692,755 | S | * | 11/2013 | Curnutt | D9/434 |
| 8,839,553 | B2 | * | 9/2014 | Toro | 47/39 |
| 8,955,251 | B2 | * | 2/2015 | Topping | 47/33 |

\* cited by examiner

*Primary Examiner* — Kristen C Hayes
(74) *Attorney, Agent, or Firm* — Jacobson Holman, PLLC.

(57) ABSTRACT

A raised garden bed is provided including wood plank sides that are secured at their joints with corner brackets forming corners. The brackets have two panels joined along one edge with a U-shaped channel at the base of each panel to receive a wood plank. Louvers extend into the channels to hold the planks with a press fit and allow the bed to be assembled and used without screws.

12 Claims, 6 Drawing Sheets

RAISED GARDEN BED WITH LOUVER-SECURED CORNER BRACKETS

BACKGROUND OF THE INVENTION

1. Field of the Invention

The present invention is related to the field of gardening and, more particularly, to a raised garden bed having louvered corner brackets to improve the structural integrity of the bed.

2. Description of the Related Art

Gardening is a very popular hobby, with raised garden beds being a preferred way to contain the plants within an established area. Raised garden beds are often constructed of wood planks that are joined at their ends to adjacent planks to form joints and are held together with screws at the joints. Because the beds are made of wood planks, the planks are prone to warp over time when exposed to the elements. Further, the pressure of the soil in the bed, combined with water-aging of the planks, can cause dimensional changes resulting in the frame coming apart at the joints. Therefore, a need exists for an improved garden bed that is resistant to separation of the wooden sides of the bed.

SUMMARY OF THE INVENTION

In view of the foregoing, the present invention is directed to a raised garden bed having wood plank sides that are secured at their joints with angled brackets forming corners. Each corner bracket has a first section and a second section, with each section having an outer side panel and a U-shaped channel. The outer side panels of the first and second sections are generally vertical and are joined along one edge at an angle, such as 90 degrees. The U-shaped channel is formed by a lower end of each side panel which has two generally 90 degree bends. The first bend forms a base that is generally perpendicular to the side panel, and the second bend creates an upwardly directed inner flange that is generally parallel with the outer side panel and spaced therefrom by the base. The result is a U-shaped channel that is open at the top.

Louvers extend into the channels to hold the planks with a press fit and allow the bed to be assembled and used without screws. Elimination of the screws that are traditionally necessary to secure the planks to the corners keeps the raised garden bed intact as there are no screw holes or punctures in the wood that result in accelerated rotting of the wood. Since screws prevent the wood sides from contracting and expanding naturally, which results in further splitting of the wood, eliminating the screws through use of the louvered corner brackets according to the present invention also prevents splitting damage to the wood.

Accordingly, it is an object of the present invention to provide an improved raised garden bed having wood plank sides interconnected by corner brackets that eliminates the need for screws to connect the adjoining ends of the wood plank sides to one another and thereby prevents damage to the wood planks that would otherwise be caused by the conventional use of screws.

Another object of the present invention is to provide a raised garden bed in accordance with the preceding object in which the wood plank sides are secured at their joints with corner brackets having two sections, each section having a side panel and a U-shaped channel, the two side panels being joined along one edge to form a 90 degree angled corner.

A further object of the present invention is to provide a raised garden bed in accordance with the preceding objects in which the U-shaped channel is formed by two 90 degree bends of a lower end of each side panel, the first bend forming a base that is generally perpendicular to the side panel and the second bend forming a flange that extends upwardly from and generally perpendicular to the base, and generally parallel with the side panel and spaced therefrom by the base, the channel being open at the top to receive the wood planks.

Yet a further object of the present invention is to provide a raised garden bed in accordance with the preceding objects in which the inner side of each bracket side panel and the inner side of each flange includes an inwardly and downwardly directed elongated louver, the elongated louvers extending longitudinally in line with the length of the base and holding the planks with a press fit during assembly and use of the bed.

Another object of the present invention is to provide a raised garden bed in accordance with the preceding objects in which the inner surface of the flange includes a second, laterally and inwardly oriented louver that is generally perpendicular to the longitudinally extending louver on the flange.

Yet another object of the present invention is to provide a raised garden bed in accordance with the preceding objects in which the louvers are strategically placed so that they create opposing forces in the horizontal and vertical directions, holding the wood planks firmly in place and counteracting the tendency of the planks to pull apart over time when exposed to the outside elements.

Still another object of the present invention is to provide a raised garden bed in accordance with the preceding objects in which the side panels of the corner brackets include decorative cutouts.

Yet a further object of the present invention is to provide a raised garden bed that is not complex in structure and which can be manufactured at low cost and efficiently constructed without the need for screws to hold the sides together.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
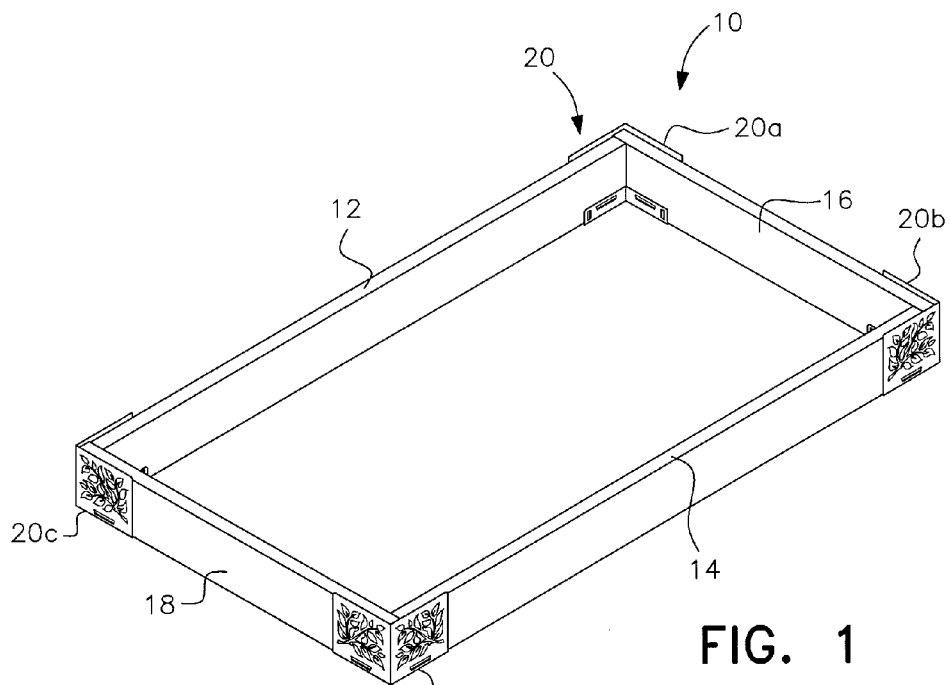
FIG. 1 is a top side perspective view of a raised garden bed as assembled in accordance with the present invention.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, and alternative structure, specific terminology will be resorted to for the sake of clarity. It is to be understood that each specific term includes all technical equivalents which operate in a similar manner to accomplish a similar purpose.

As shown in FIG. 1, the present invention is directed to a raised garden bed, generally designated by reference numeral 10. The garden bed include two side wood planks 12, 14, and two end wood planks 16, 18 to form a generally rectangular garden bed. The side planks 12, 14 are joined at their respective ends to corresponding respective ends of the adjoining end planks 16, 18 by a plurality of louvered corner brackets, generally designated by reference numeral 20. There are four individual louvered corner brackets 20a, 20b, 20c and 20d in a rectangular bed. The brackets are preferably made of metal, but other materials such as hard plastic or the like could be used. In addition, while the planks are described herein as being made of wood, other materials could be used to form the sides of the bed such as hard plastic, hard-coated cardboard, and composite materials made of recycled wood and resin such as are used for decking, and the like.

Figure 2:
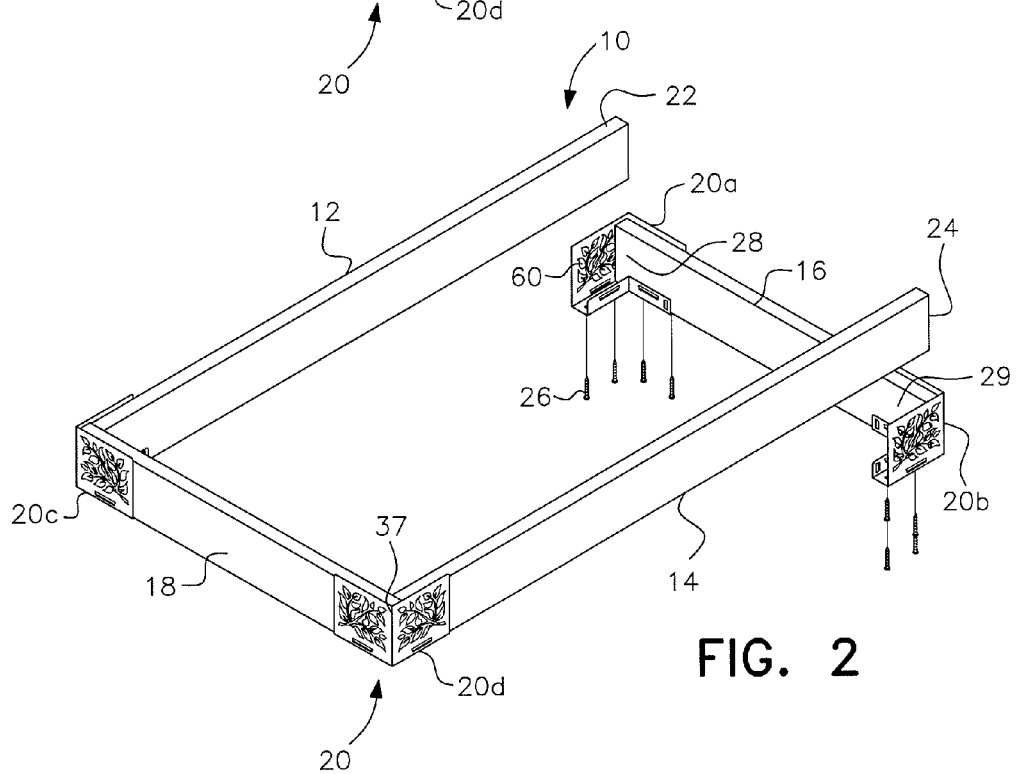
FIG. 2 is a top side exploded perspective view of the raised garden bed shown in FIG. 1 with one end detached.

In FIG. 2, one end plank 16 and the two louvered corner brackets 20a, 20b attached thereto, are shown as separated from the respective end parts 22, 24 of the side planks 12, 14. Wood screws 26 may be used to complete the assembly but they are not necessary. The wood screws are only used to secure the louvered bracket 20a to the end parts 22, 24 of the side planks 12, 14 and the end parts 28, 29 of the end planks 16, 18. The louvered corner brackets 20 themselves are what actually connect the side planks 12, 14 to the end planks 16, 18 to form the bed.

Figure 3:
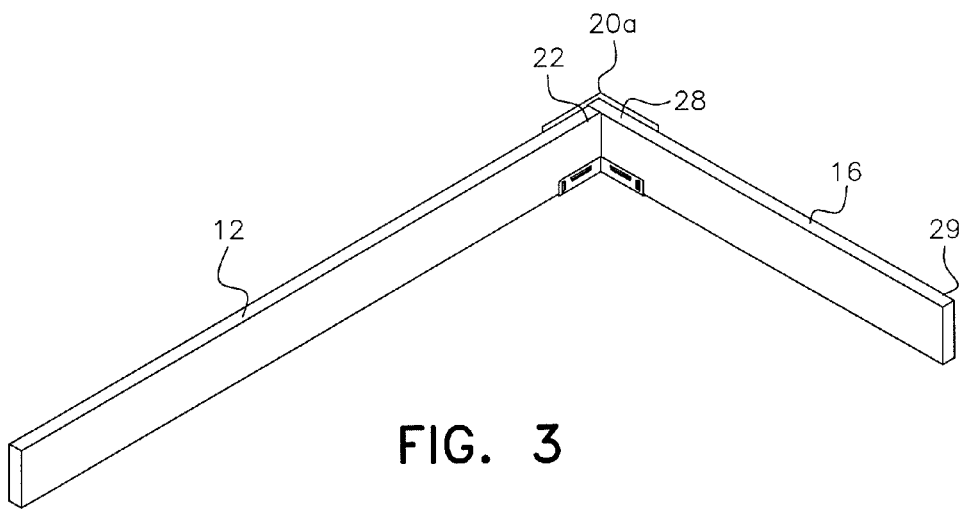
FIG. 3 is a top side perspective view of one end plank, one side plank and a louvered bracket as assembled to form one corner of the bed shown in FIG. 1.

FIG. 3 shows one assembled corner of the garden bed 10 including one side plank 12, one end plank 16 and the louvered bracket 20a securing the end part 22 of the side plank 12 to the end part 28 of the end plank 16. The components shown in FIG. 3 are illustrated in an exploded view in FIG. 4.

Figure 5A:
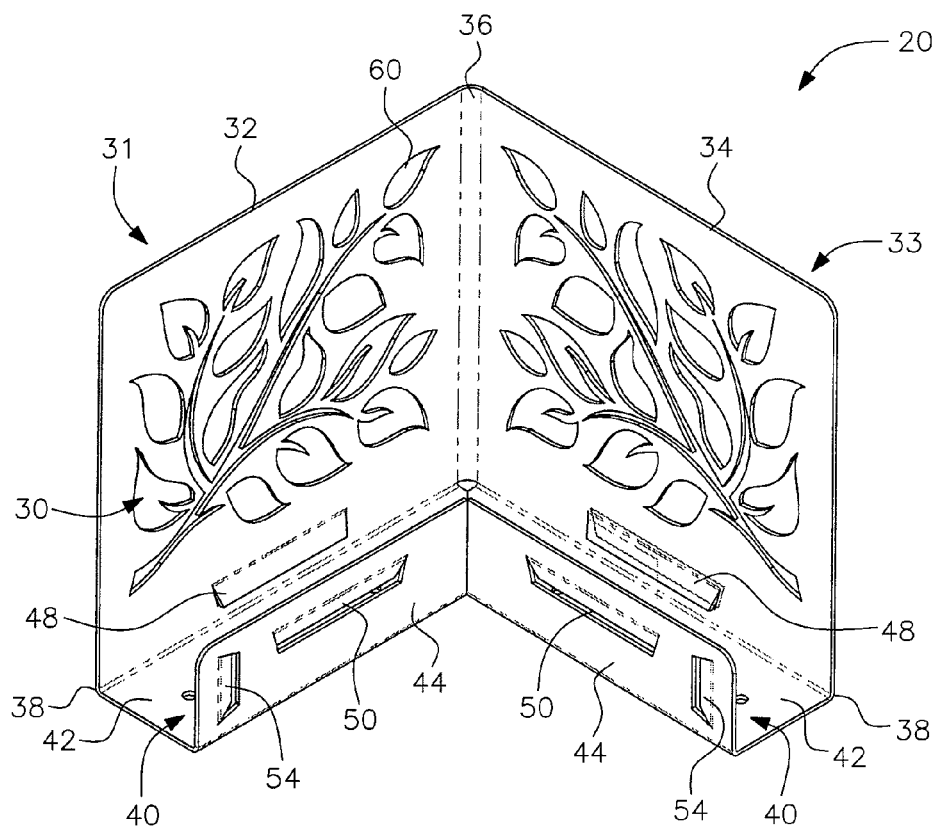
FIG. 5A is a top side perspective view of the louvered bracket shown in FIGS. 1-4.
Figure 5C:
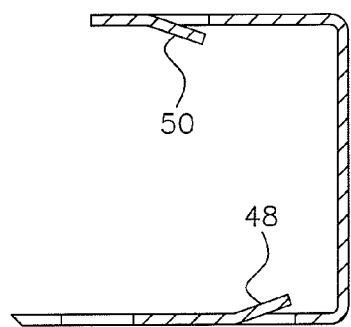
FIG. 5C is a sectional view taken along line A-A of FIG. 5B showing the longitudinally extending louvers on the panels and the flanges.
Figure 5E:
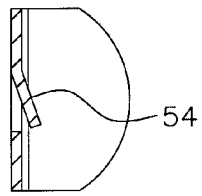
FIG. 5E is a sectional view taken along line B-B of FIG. 5D showing the laterally extending vertical louver on one of the flanges.

FIG. 5A shows a louvered corner bracket from a top and inner side perspective view showing the inner side, generally designated by reference numeral 30, of the bracket. By "inner" is meant that side of the bracket that faces the interior of the garden bed when the bed is assembled. The louvered corner bracket 20 includes a first or left hand section, generally designated by reference numeral 31, and a second or right hand section, generally designated by reference numeral 33.

The first or left hand section 31 includes an outer panel 32 and a U-shaped channel generally designated by reference numeral 40. The second or right hand section 33 includes an outer panel 34 and a U-shaped channel 40. The outer panels 32, 34 are generally vertical and are joined along one vertical edge 36. In the embodiment shown, the angle between the panels 32 and 34 is essentially 90 degrees.

Each U-shaped channel 40 is formed by the bottom edge 38 of a respective outer side panel 32, 34, a base 42 that is generally perpendicular to the side panels 32, 34 and an inner flange 44 that extends upwardly from and generally perpendicular to the base 42. The flange 44 is generally parallel with the side panels 32, 34 and spaced therefrom by the width of the base 42. The channels 40 are open at the top to receive the wood planks 12, 14, 16, 18. In the embodiment shown, the side panel base and flange are integral, being formed by two 90 degree bends of the lower end of the side panel, the first bend forming the base 42 and the second bend forming the flange 44. It would be possible to make the base and the flange as separate pieces joined to one another and to the panel with angle iron or the like, but this is not preferred.

The base 42 and inner flange 44 are cut away, as at 43, in order to accommodate the angle bend between side panels 32, 34 along edge 36.

Figure 5B:
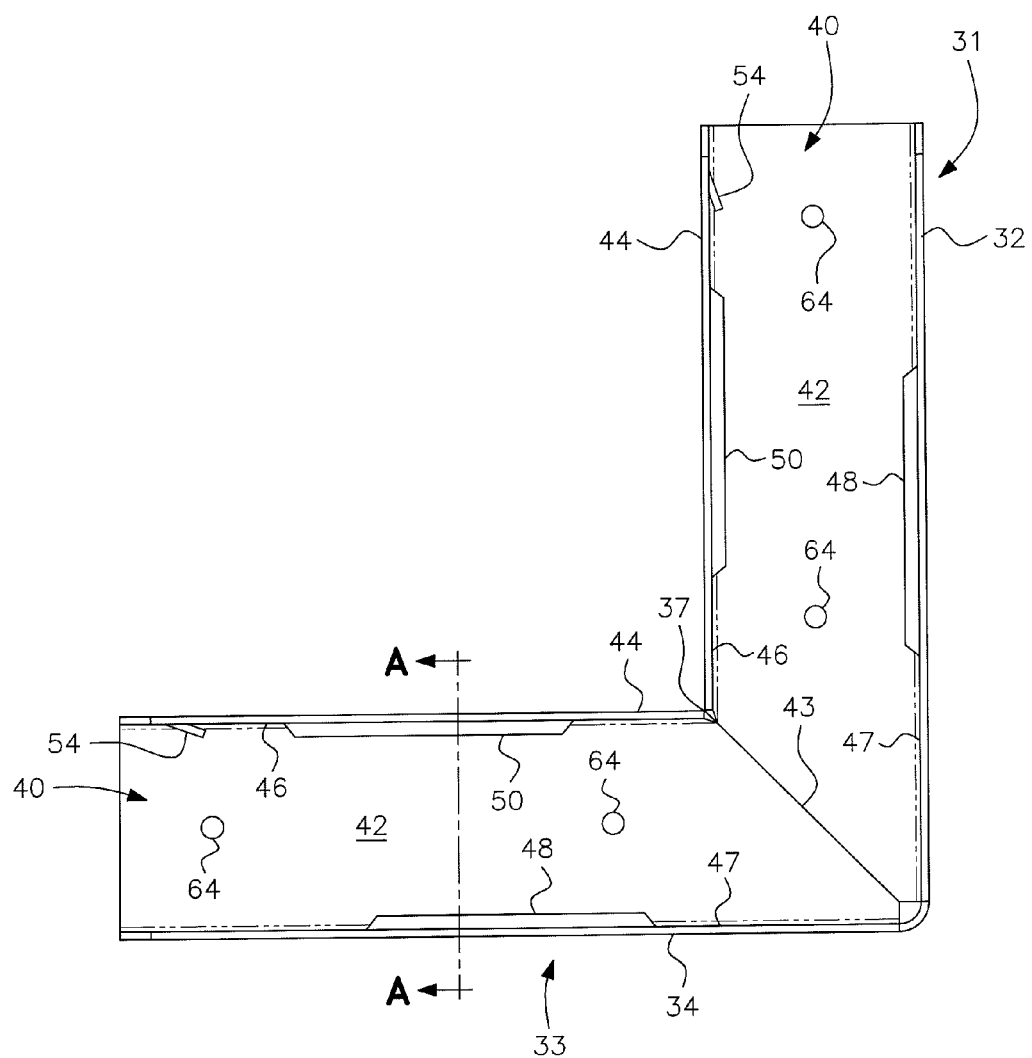
FIG. 5B is an inside view of the louvered bracket shown in FIG. 5A.
Figure 5D:
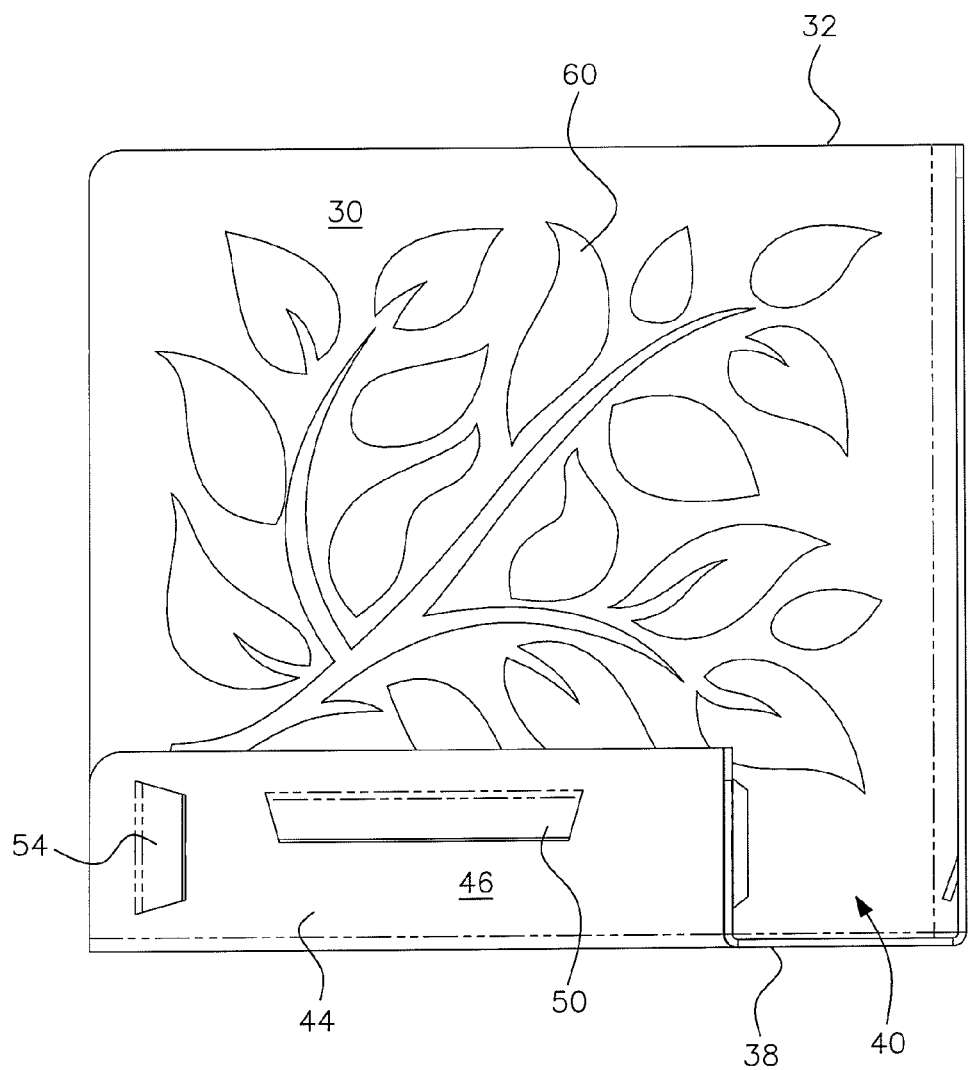
FIG. 5D is a side view of the left hand section of the louvered bracket shown in FIG. 5A looking toward the inner side.
Figure 5F:
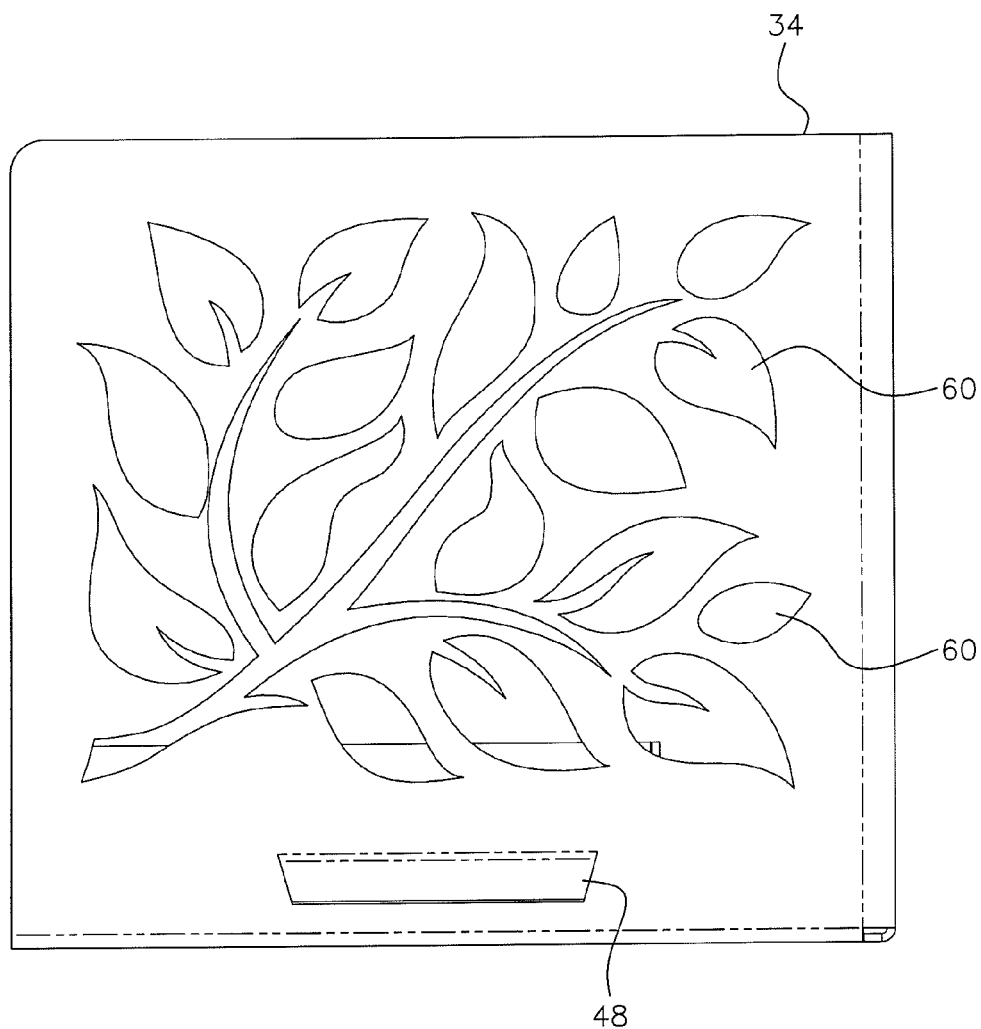
FIG. 5F is a side of the right hand side panel of the louvered corner bracket shown in FIG. 5A as seen from the outer side or the side opposite the side with the inwardly directed louvers.

Each bracket outer side panel 32, 34 includes at least one elongated horizontal louver 48 that projects inwardly from the inner side 47 of the panel. Similarly, each inner flange 44 includes at least one elongated horizontal louver 50 that projects inwardly from the inner side 46 of the inner flange 44. The louvers 48, 50 are preferably similar in size and shape and extend longitudinally in line with the length of the base 42. The louvers are also positioned in overlapping relationship horizontally to each as shown in FIG. 5B. While the overlapping relationship is not required, the planks are more tightly gripped by the brackets when the louvers are placed in overlapping relationship.

The inner side 46 of each flange 44 preferably further includes a second, short laterally-extending vertical louver 54 that is generally perpendicular to the longitudinally extending louver 50 on the flange 44. The louvers 48, 50 and 54 hold the planks with a press fit during assembly and use of the bed and also counteract the forces created by board warping over time which might otherwise act to pull the boards apart.

As shown in FIGS. 1, 2, 4, 5A, 5D and 5F, the side panels 32, 34 preferably include decorative cutouts 60. The cutouts 60 may be made in virtually any pattern and add to the aesthetics of the garden bed. The cutouts 60 are not necessary, however, to the use of the louvered corner brackets in connecting the wood planks to one another in accordance with the present invention.

Figure 4:
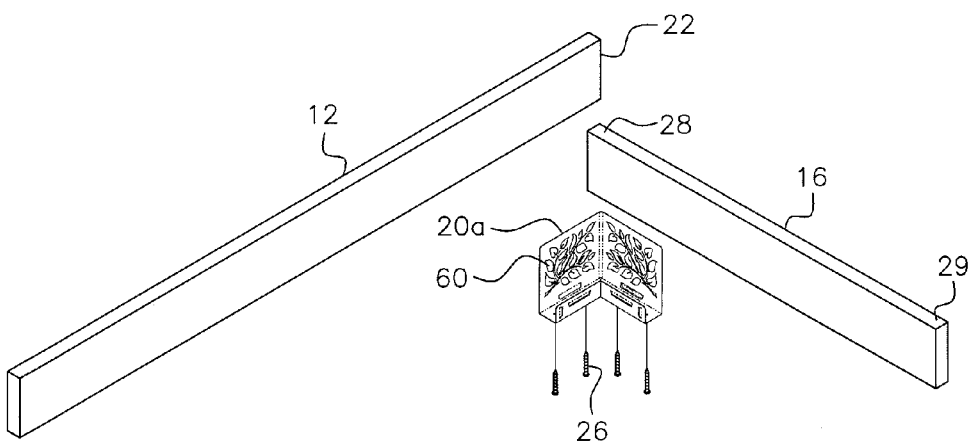
FIG. 4 is a top side exploded perspective view of the two wood planks and louvered bracket shown in FIG. 3.

To construct the garden bed, the user has only to insert the end 22 of a side plank 12 into the channel 40 adjacent the side panel 32 of bracket 20a and the end 28 of an end plank 16 into the channel 40 adjacent the side panel 34 of bracket 20a as can be seen from FIGS. 3 and 4. Similarly, the end 24 of side plank 14 is inserted into the channel 40 adjacent the side panel 34 of bracket 20b, and the end 29 of end plank 16 is inserted into the channel 40 adjacent the side panel 32 of bracket 20b. The planks are most readily inserted from the top and pressed down, but could be pushed sideways into the bracket. Once inserted into the bracket channels, the planks overlap in the crotch 37 of the bracket. The same procedure is followed with the brackets 20c and 20d used to form the two corners on the opposite end of the bed.

The louvers 48, 50 and 54 hold the planks with a press fit during assembly and use of the bed. Optionally, wood screws 26 may be inserted through apertures 64 in the base 42 of the channels 40 and screwed into the bottom edges of the planks to firmly secure the brackets 20 to the planks 12, 14, 16, 18. But the planks will remain secured within the louvered brackets even without the screws 26.

In use, the louvers hold the planks firmly in place and counteract the tendency of the planks to pull apart over time when exposed to the outside elements. In addition, the louvers are strategically placed so that the boards create opposing forces in the horizontal and vertical directions.

While a rectangular garden bed is shown and described herein, the louvered brackets of the present invention can also be used with garden beds of other shapes including triangular, pentagonal, hexagonal, etc., by changing the angle at which the two side panels of each bracket are joined and the number of planks used. Therefore, the present invention is not intended to be limited to garden beds of only one shape or configuration. Whatever the shape of the garden bed that is formed by joining adjacent planks to one another using brackets of the type described herein, the louvers in the bracket channels will serve to secure the planks together without screws in the same manner as fully described herein.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A raised garden bed comprising:
   at least three side planks, each side plank having a first end and a second end;
   a plurality of corner brackets, each bracket connecting adjacent ends of two side planks and including two sections with each section having a side panel, the two side panels being joined along one adjacent edge to form a corner, each section of the bracket including a U-shaped channel open at the top to receive a plank, said U-shaped channel being formed by a base that is generally perpendicular to a respective side panel and a flange that extends upwardly from and generally perpendicular to the base, the flange also being generally parallel with the respective side panel and spaced therefrom by a width of the base, the flange including a first louver that projects inwardly into the channel and that extends longitudinally and generally parallel with a length of the channel, and a second, laterally oriented, louver that is generally perpendicular to the longitudinally extending first louver on the flange, said first and second louvers securing a plank in the channel with a press fit during assembly and use.

2. The garden bed as set forth in claim 1, wherein each bracket side panel includes a third louver that projects inwardly into the channel on side of said channel opposite said flange, the third louver extending longitudinally and generally parallel with a length of the channel.

3. The garden bed as set forth in claim 2, wherein said louvers are positioned along the flange and panel so that the planks create opposing forces in the horizontal and vertical directions, the louvers holding the planks firmly in place and counteracting any tendency of the planks to pull apart over time when exposed to outside elements.

4. The garden bed as set forth in claim 1, wherein the side panel, base and flange are integral, the base being generally horizontal and formed by a first 90 degree bend of a lower end of the panel, and the flange being generally vertical and formed by a second 90 degree bend upwardly from the base.

5. The garden bed as set forth in claim 1, wherein each bracket side panel includes decorative cutouts.

6. The garden bed as set forth in claim 1, wherein the bed includes four planks and four brackets and is generally rectangular when assembled.

7. A method of making a generally rectangular raised garden bed comprising:
   providing two side planks each having a first end and a, second end, two end planks having a first end and a second end;
   providing four brackets, each bracket including a first channel and a second channel for receiving two of the planks, respectively, the first and second channels of each bracket being at an angle from one another, each channel having at least one inwardly directed louver that secures the plank in the channel with a press fit during assembly;
   inserting a first end of first side plank into a first channel of a first bracket;
   inserting a first end of a first end plank into a second channel of the first bracket;
   inserting a second end of the first end plank into a first channel of the second bracket;
   inserting a first end of second side plank into a second channel of the second bracket;
   inserting a second end of second side plank into a first channel of a third bracket;
   inserting a first end of a second end plank into a second channel of the third bracket;
   inserting a second end of the second end plank into a first channel of a fourth bracket; and
   inserting a second end of the first side plank into a second channel of the fourth bracket.

8. The method as set forth in claim 7 wherein the steps of inserting include pushing the planks downwardly into the channels from a top of the bracket.

9. The method as set forth in claim 8, wherein each of said brackets includes a first louver that projects inwardly into the respective channel, extending longitudinally and generally parallel with a length of the channel, and a second, laterally oriented, louver that is generally perpendicular to the longitudinally extending first louver, said step of pushing the planks downwardly into the channels from a top of the bracket including said first and second louvers securing the plank in the channel with a press fit.

10. A raiser garden bed comprising:
    at least three side planks, each side plank having a first end and a second end;
    a plurality of corner brackets, each bracket connecting adjacent ends of two side planks, each bracket including two sections each having a side panel, said side panels being joined along one edge at an angle, the lower end of each side panel having a first generally 90 degree bend that forms a base which is generally perpendicular to the panel, and a second generally 90 degree bend that creates an upwardly directed flange that is generally parallel with the side panel and spaced therefrom by the base, the side panel, base and flange creating a U-shaped channel that is open at the top for receiving one of the planks;
    each flange including a first louver and a second louver that project inwardly into the channel, said louvers securing the plank in the channel with a press fit during assembly and use, the first louver extending longitudinally and generally parallel with a length of the channel, and the second louver being laterally oriented so as to be generally perpendicular to the longitudinally extending louver on the flange.

11. The garden bed as set forth in claim 10, wherein each bracket side panel includes decorative cutouts.

12. The garden bed as set forth in claim 10, wherein each bracket side panel includes a third louver that projects inwardly into the channel on a side of said channel opposite said flange, the louver extending longitudinally and generally parallel with a length of the channel.

* * * * *